United States Patent
Murphey

(10) Patent No.: US 12,553,545 B2
(45) Date of Patent: Feb. 17, 2026

(54) HYBRID INFLATABLE BOOM

(71) Applicant: Thomas W. Murphey, Fort Collins, CO (US)

(72) Inventor: Thomas W. Murphey, Fort Collins, CO (US)

(73) Assignee: Opterus Research and Development, Inc., Fort Collins, CO (US)

(*) Notice: Subject to any disclaimer, the term of this patent is extended or adjusted under 35 U.S.C. 154(b) by 214 days.

(21) Appl. No.: 18/200,307

(22) Filed: May 22, 2023

(65) Prior Publication Data

US 2023/0407999 A1    Dec. 21, 2023

Related U.S. Application Data

(60) Provisional application No. 63/353,698, filed on Jun. 20, 2022.

(51) Int. Cl.
| | | |
|---|---|---|
| *F16L 11/12* | (2006.01) | |
| *F16L 11/02* | (2006.01) | |
| *F16L 11/08* | (2006.01) | |

(52) U.S. Cl.
CPC .............. *F16L 11/121* (2013.01); *F16L 11/02* (2013.01); *F16L 11/08* (2013.01)

(58) Field of Classification Search
CPC .......... F16L 11/121; F16L 11/02; F16L 11/08; B64G 1/2225; B64G 1/2227; B64G 1/222; B64G 1/44; B64G 1/443; B64G 1/446; B32B 7/022; B32B 1/08; B32B 3/08; B32B 5/12; B32B 5/26; B32B 37/06; B32B 37/10; E04C 3/005; B65H 75/34; B65H 2701/332; B65H 75/4402; B65H 75/4471
See application file for complete search history.

(56) References Cited

U.S. PATENT DOCUMENTS

| | | | | |
|---|---|---|---|---|
| 3,508,587 | A * | 4/1970 | Mauch ................. | F16L 11/121 251/4 |
| 6,780,162 | B2 * | 8/2004 | Pounder ................ | D04C 1/06 602/8 |
| 9,840,060 | B2 * | 12/2017 | Francis ................. | B29C 61/00 |
| 10,147,995 | B2 * | 12/2018 | Daton-Lovett ......... | H01Q 1/36 |
| 2003/0182879 | A1 * | 10/2003 | Warren ................ | B64G 1/2225 52/108 |
| 2016/0177567 | A1 * | 6/2016 | Gandhi ................ | B64G 99/00 29/897.33 |
| 2017/0058524 | A1 * | 3/2017 | Fernandez ............. | E04C 3/005 |
| 2020/0122864 | A1 * | 4/2020 | Murphey ............... | B64G 1/44 |
| 2021/0339894 | A1 * | 11/2021 | Murphey ............... | B64G 1/443 |

* cited by examiner

*Primary Examiner* — Theodore V Adamos
(74) *Attorney, Agent, or Firm* — Harris Beach Murtha Cullina PLLC

(57) ABSTRACT

A deformable hybrid inflatable boom includes an inflatable tube of a first material having an inflatable tube surface and an inflatable tube longitudinal boom direction in a hybrid inflatable boom inflated state. Each longeron of a plurality of longerons is disposed on the inflatable tube surface and spaced apart from each other and held in place by the inflatable tube, and in the hybrid inflatable boom inflated state the each longeron is extended in a direction of the inflatable tube longitudinal boom direction. A method for deploying a deformable hybrid inflatable boom is also described.

18 Claims, 9 Drawing Sheets

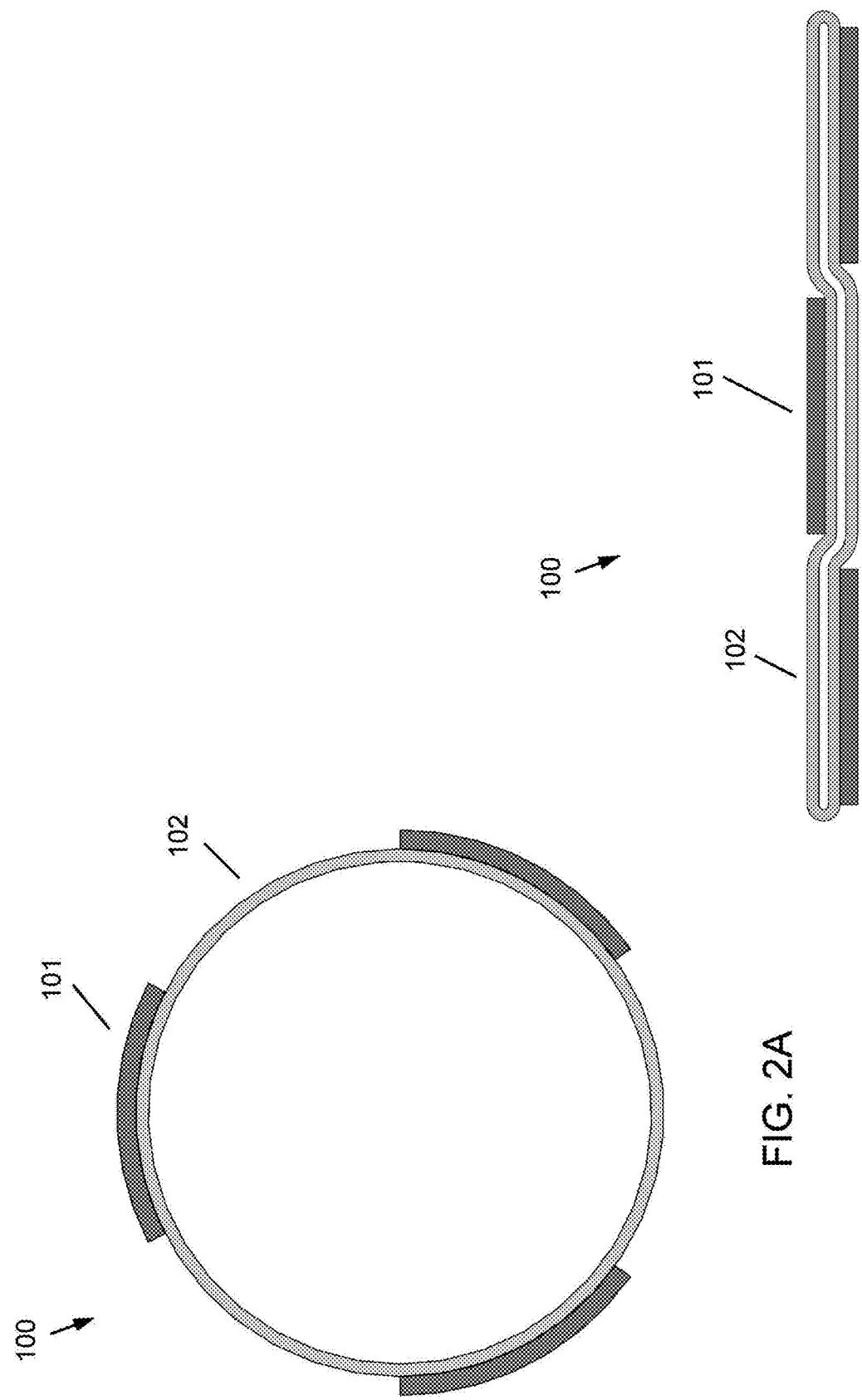

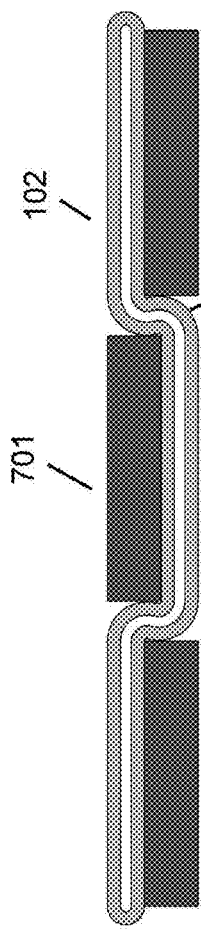
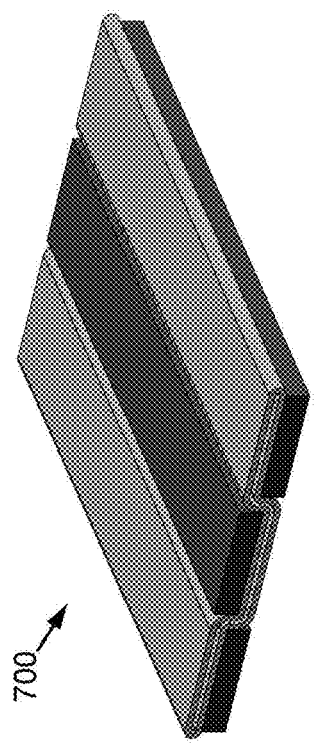
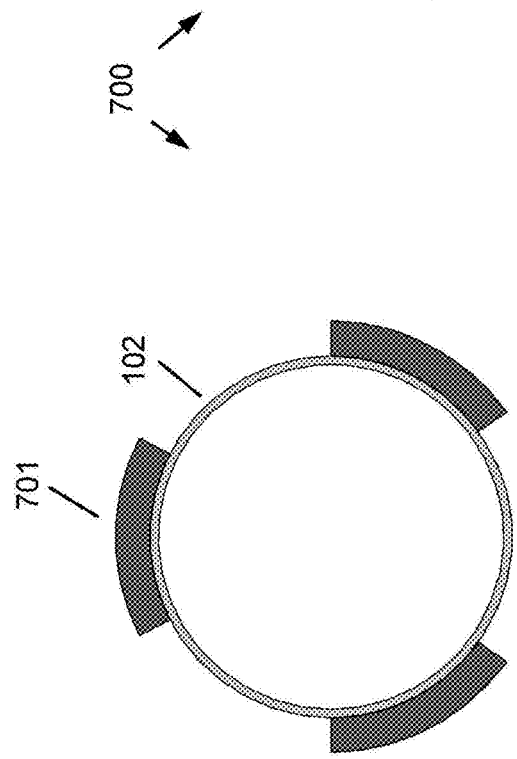
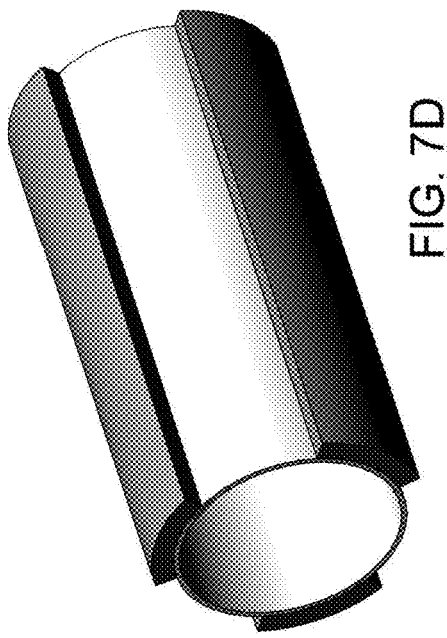

HYBRID INFLATABLE BOOM

CROSS REFERENCE TO RELATED APPLICATIONS

This application claims priority to and benefit of U.S. provisional patent application Ser. No. 63/353,698, HYBRID INFLATABLE BOOM, filed Jun. 20, 2022, which application is incorporated herein by reference in its entirety.

TECHNICAL FIELD

The application relates to deformable booms, particularly to inflatable deformable booms.

BACKGROUND

Trusses, such as truss booms, typically use longerons, straight structural elements running the full length of a boom, to provide axial and bending stiffness. A network of battens and diagonal struts is required to hold the longeron in place under load to prevent the longerons from buckling.

SUMMARY

A deformable hybrid inflatable boom includes an inflatable tube of a first material having an inflatable tube surface and an inflatable tube longitudinal boom direction in a hybrid inflatable boom inflated state. Each longeron of a plurality of longerons is disposed on the inflatable tube surface and spaced apart from each other and held in place by the inflatable tube, and in the hybrid inflatable boom inflated state each longeron is extended in a direction of the inflatable tube longitudinal boom direction.

In a hybrid inflatable boom flattened state, the plurality of longerons can be interleaved with each other between an undulating flattened tube. At least one longeron can be disposed on an outer surface of the inflatable tube. At least one longeron can have a different longeron width in cross-section than another different longeron width. At least one longeron can have a different longeron thickness in cross-section than another different longeron thickness. At least one longeron can be disposed on an inner surface of the inflatable tube.

The deformable hybrid inflatable boom can have an extended state, a flattened state, and a rolled state, where a stiffness and strength of the deformable hybrid inflatable boom in the extended state is greater than a different stiffness and a different strength of the deformable hybrid inflatable boom in the flattened state.

In the flattened state, a height in cross-section of a flattened deformable hybrid inflatable boom can be less than a sum of two times an inflatable tube wall thickness plus two times a longeron wall thickness.

The deformable hybrid inflatable boom can further include at least one enlarged end cavity. The deformable hybrid inflatable boom can further include at least one longitudinal cavity to house at least one wire or at least one cable.

The inflatable tube can include a polymer material. The inflatable tube can include a textile material or a polymer reinforced textile material.

The plurality of longerons can include a composite material. The plurality of longerons can include a fiberglass. The plurality of longerons can include a metal. The plurality of longerons can include a steel. The plurality of longerons can include spring tempered metal or spring steel.

The plurality of longerons can be substantially parallel to a center line in a hybrid inflatable boom flattened state. The hybrid inflatable boom can be rolled in a hybrid inflatable boom stowed state.

In some embodiments, a deformable boom comprises an inflatable tube defining a longitudinal axis and a plurality of longerons disposed on the inflatable tube and extending along the longitudinal axis. The inflatable tube is configured to transition between an inflated state and a deflated state. In the deflated state, the inflatable tube and the longerons form a boom structure with adjacent longerons disposed in radial spaced relation relative to the longitudinal axis.

In some embodiments, in the deflated state of the inflatable tube, the longerons are disposed in interleaved relation with adjacent longerons separated by sections of the inflatable tube.

In some embodiments, the inflatable tube and the longerons define an extended state, a flattened state, and a rolled state, where a stiffness and strength in the extended state is greater than a stiffness and a strength in the flattened state.

A method for deploying a deformable hybrid inflatable boom includes: providing an inflatable tube and a plurality of longerons, each longeron disposed on and held in place on an inflatable tube surface; and inflating the inflatable tube to hold each of the longerons in a place on the inflatable tube surface by a hoop stiffness of the inflatable tube, where an axial stiffness of the deformable hybrid inflatable boom is provided by the plurality of longerons.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

FIG. 2A is a drawing showing the deployed boom cross-section of the HI boom of FIG. 1A;

FIG. 2B is a drawing showing the flattened boom cross-section of the HI boom of FIG. 1B;

FIG. 7A is a drawing showing a cross-section of a flattened HI boom with a relatively thick tape relative to the cross section thickness of the inflatable tube;

FIG. 7B is a drawing showing an isometric view of the flattened HI boom of FIG. 7A;

FIG. 7C is a drawing showing a cross-section drawing of the inflated HI boom of FIG. 7A;

FIG. 7D is a drawing showing an isometric view of the inflated HI boom of FIG. 7A;

DETAILED DESCRIPTION

Trusses typically use longerons, straight structural elements running the full length of a boom, to provide axial and bending stiffness. A network of battens and diagonal struts is required to hold the longeron in place under load to prevent the longerons from buckling.

The new hybrid inflatable (HI) Boom according to the Application, uses features from both inflatable booms and the elastic strain energy of deployed booms to make a deployable truss that can flatten and roll.

In a hybrid inflatable (HI) Boom according to the Application, the batten and diagonal network are replaced by an inflatable tube. The inflatable tube does not contribute significantly to the axial and bending stiffness of the boom. The tube and the force of its internal inflation pressure holds the longerons in place, sometimes referred to as a hoop stiffness. The tube also contributes shear and torsional stiffness and strength to the boom. However, the axial stiffness of an inflated deployed HI boom is substantially provided by the longerons. On deflation of the tube, the HI boom can be flattened and rolled.

By placing the longerons so that they are interleaved in the flattened state, combined with the flexible nature of the tube, the flattened HI boom can have a thinner flattened cross-section, where all folded components are closer to a central neutral axis of the flattened state. The undulation of the flatted tube state allowed by the interleaving of the longerons in the flattened state causes the flattened boom to be thinner in the flattened state than it would be without the interleaved longerons. There is typically some spacing between the interleaved longerons to allow for the tube thickness (in cross-section) and for the undulating folds of the tube wall between the longerons.

In comparison to collapsible tubular mast (CTM) approaches, the new HI Boom is easier to fabricate. Longerons are co-cured or bonded onto any tube than can be flattened and rolled. The tube material is more flexible and able to contain tube pressure while the longeron material is more structural.

Figure 1C:
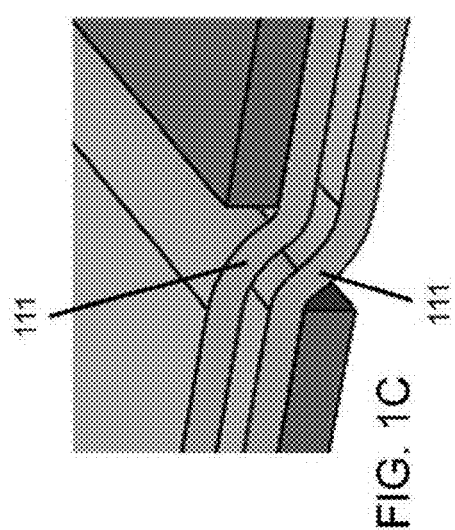
FIG. 1C is a drawing showing more detail of the flattened tube with undulations of FIG. 1B.
Figure 1B:
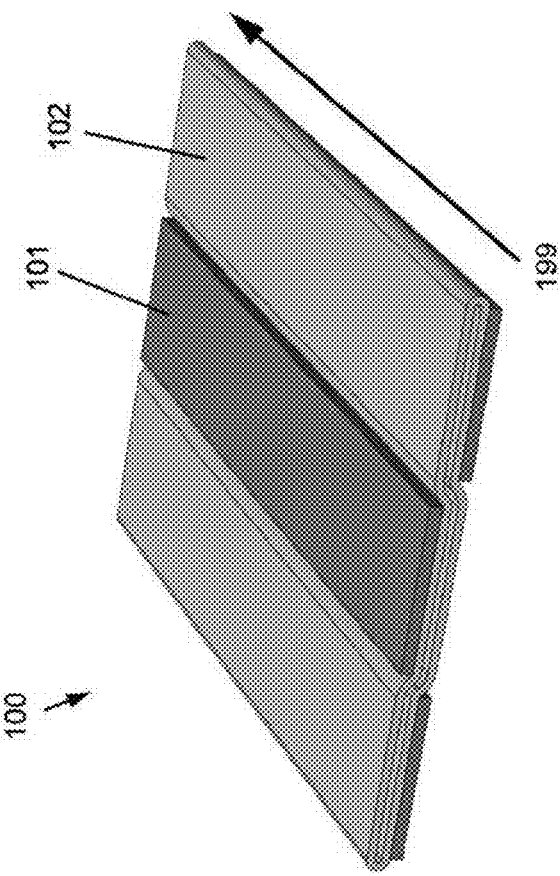
FIG. 1B is a drawing showing the HI boom of FIG. 1A flattened.
Figure 1A:
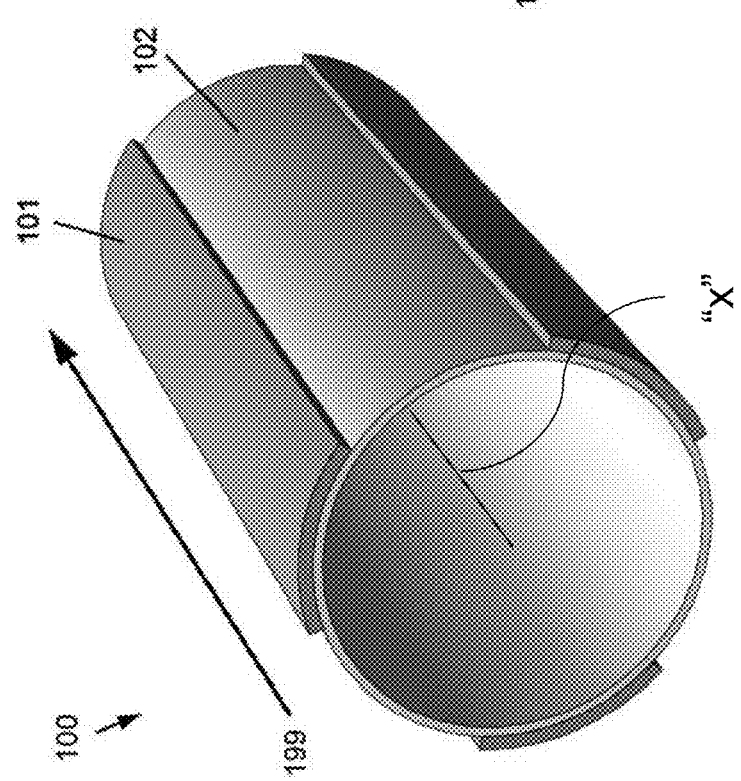
FIG. 1A is a drawing showing an exemplary deployed HI boom according to the Application.

FIG. 1A and FIG. 1B show an exemplary HI boom according to the Application. FIG. 1A is a drawing showing an exemplary deployed HI boom according to the Application. FIG. 1B is a drawing showing the HI boom of FIG. 1A flattened. FIG. 1C is a drawing showing more detail of the flattened tube with undulations of FIG. 1B.

With reference to FIG. 1A, a deformable hybrid inflatable boom 100 includes an inflatable tube 102 of a first material having an inflatable tube surface and an inflatable tube longitudinal boom direction in a hybrid inflatable boom inflated state. Each longeron 101 of a plurality of longerons is disposed on the inflatable tube 102 surface and spaced apart from each other and held in place by the inflatable tube 102, and in the hybrid inflatable boom inflated state the each longeron 101 is extended in a direction of the inflatable tube longitudinal boom direction 199. Otherwise stated, the inflatable tube 102 defines a central longitudinal axis "x" extending through the tube parallel to the boom direction 199. Adjacent longerons 101 are radially spaced with respect to the longitudinal axis. In the inflated state of the inflatable tube 102, the longerons 101 are radially spaced relative to the longitudinal axis, and, in some embodiments, are equally spaced, having the same the angular displacement therebetween. In a hybrid inflatable boom flattened state (FIG. 1B, FIG. 1C), the plurality of longerons 101 may be interleaved with each other between an undulating flattened tube 111.

FIG. 2A and FIG. 2B show end cross-section views of the deployed and flattened booms of FIG. 1A and FIG. 1B, respectively. FIG. 2A is a drawing showing the deployed boom cross-section of the HI boom of FIG. 1A. FIG. 2B is a drawing showing the flattened boom cross-section of the HI boom of FIG. 1B.

Figures 3A, 3B, 3C:
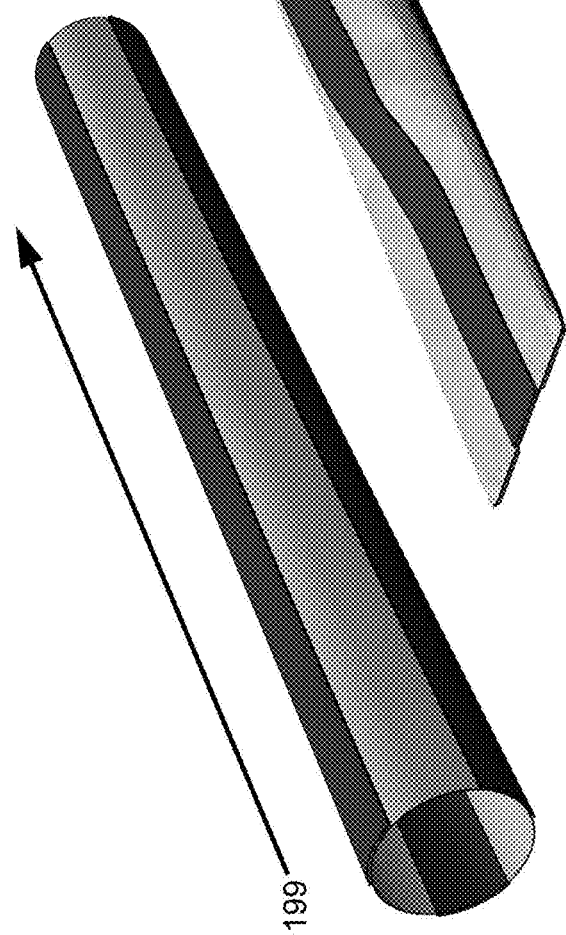
FIG. 3A is a drawing showing an initial deployment of an HI boom.
FIG. 3B is a drawing showing one end of the boom of FIG. 3A flattened.
FIG. 3C is a drawing showing the boom of FIG. 3A partially rolled.

FIG. 3A, FIG. 3B, and FIG. 3C show rolling simulation results for the exemplary HI boom of FIG. 1A and FIG. 1B and FIG. 2A and FIG. 2B. FIG. 3A is a drawing showing an initial deployment of an HI boom of FIG. 3A. FIG. 3B is a drawing showing one end of the boom of FIG. 3A flattened. FIG. 3C is a drawing showing the boom partially rolled.

Cavities can be added for wires, tubes, fiber optic cables, etc. These cavities are important in the folded flattened state to provide a storage area for utility wires and cables. The cavities include end cavities, mid cavities, and enlarged mid cavities.

Figure 4:
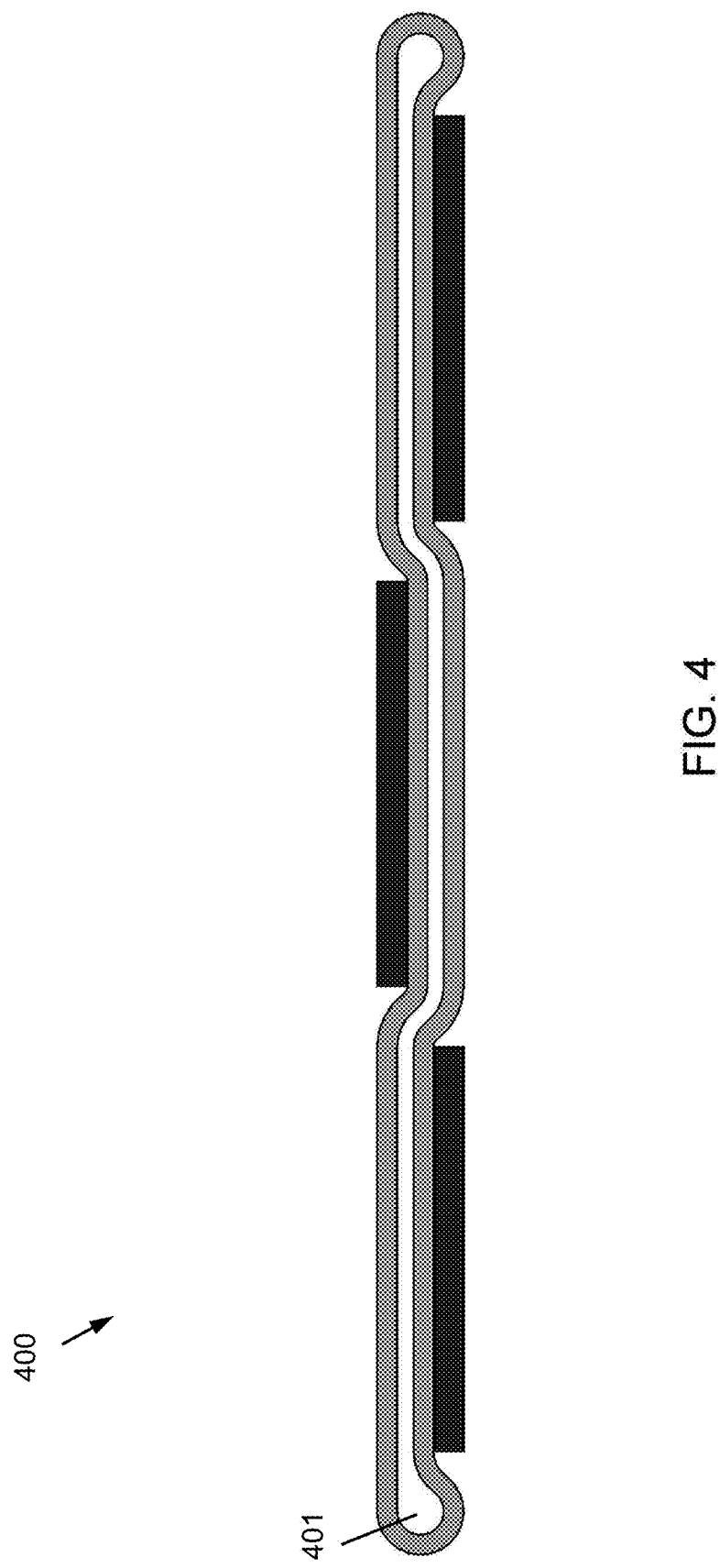
FIG. 4 is a drawing showing an HI boom with enlarged side cavities.

FIG. 4 is a drawing showing an HI boom 400 with enlarged side cavities. The flattened tube HI boom of FIG. 4 can be seen to have optional enlarged side cavities 401.

Figure 5:
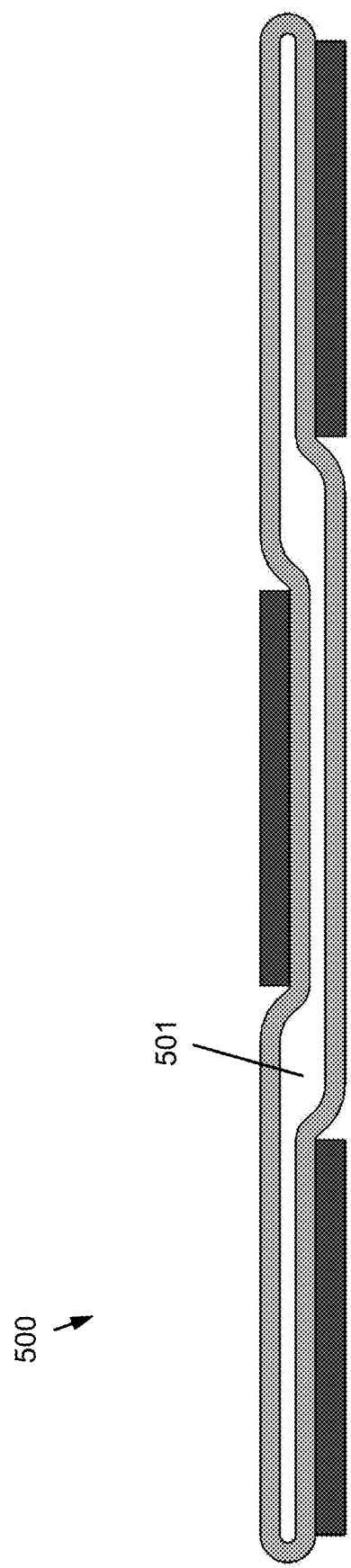
FIG. 5 is a drawing showing an exemplary HI boom with enlarged mid cavities.

FIG. 5 is a drawing showing an exemplary HI boom 500 with enlarged mid cavities 501.

Figure 6A:
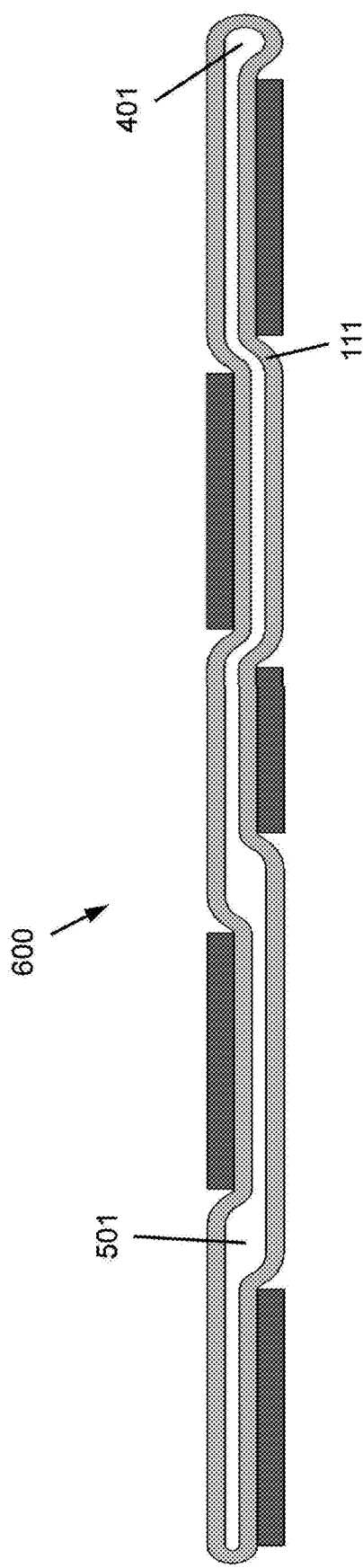
FIG. 6A is a drawing showing an exemplary HI boom having both enlarged mid cavities and end cavities.
Figure 6B:
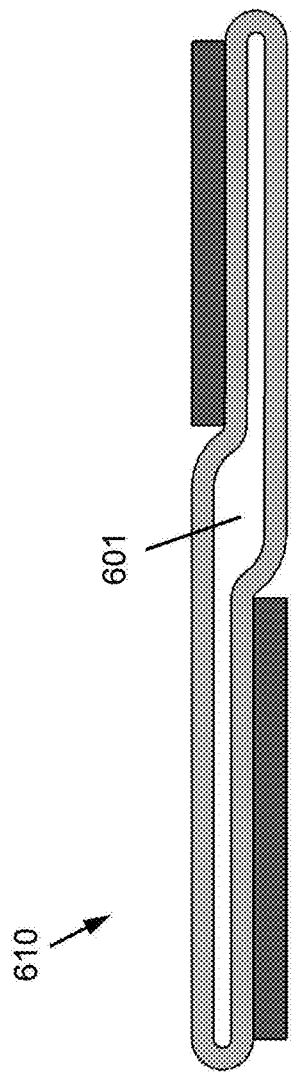
FIG. 6B is a drawing showing an exemplary HI boom having a central enlarged mid cavity.

FIG. 6A and FIG. 6B show additional exemplary longeron and cavity configurations of HI booms according to the Application. FIG. 6A is a drawing showing an exemplary HI boom 600 having both enlarged mid cavities 501 and end cavities 401. FIG. 6B is a drawing showing an exemplary HI boom 610 having a central enlarged mid cavity 601. The undulating tube 111 of FIG. 6A and other figures with flattened HI booms is similar to the undulating flattened tube of FIG. 1C.

FIG. 7A to FIG. 7D are drawings showing different views of an exemplary HI boom 700 with thicker tape longerons 701 relative to the cross section thickness of the tube material. FIG. 7A is a drawing showing a cross-section of a flattened HI boom 700 with a relatively thick tape longeron 701 relative to the cross section thickness of the inflatable tube 102. The undulating tube between the thick tape longerons 701 is similar to that of FIG. 1C. FIG. 7B is a drawing showing an isometric view of the flattened HI boom of FIG. 7A. FIG. 7C is a drawing showing a cross-section drawing of the inflated HI boom of FIG. 7A. FIG. 7B is a drawing showing an isometric view of the inflated HI boom of FIG. 7A.

Figure 8:
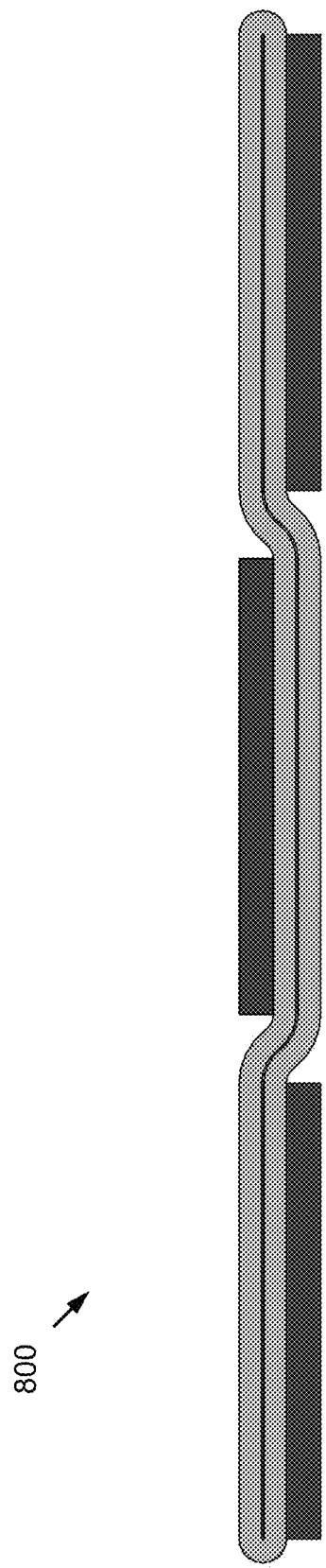
FIG. 8 is a drawing showing an exemplary view of a flattened HI boom 800 having substantially no cavity in the flattened state.

FIG. 8 is a drawing showing an exemplary view of a flattened HI boom 800 having substantially no open cavity volume in the flattened state.

Figure 9:
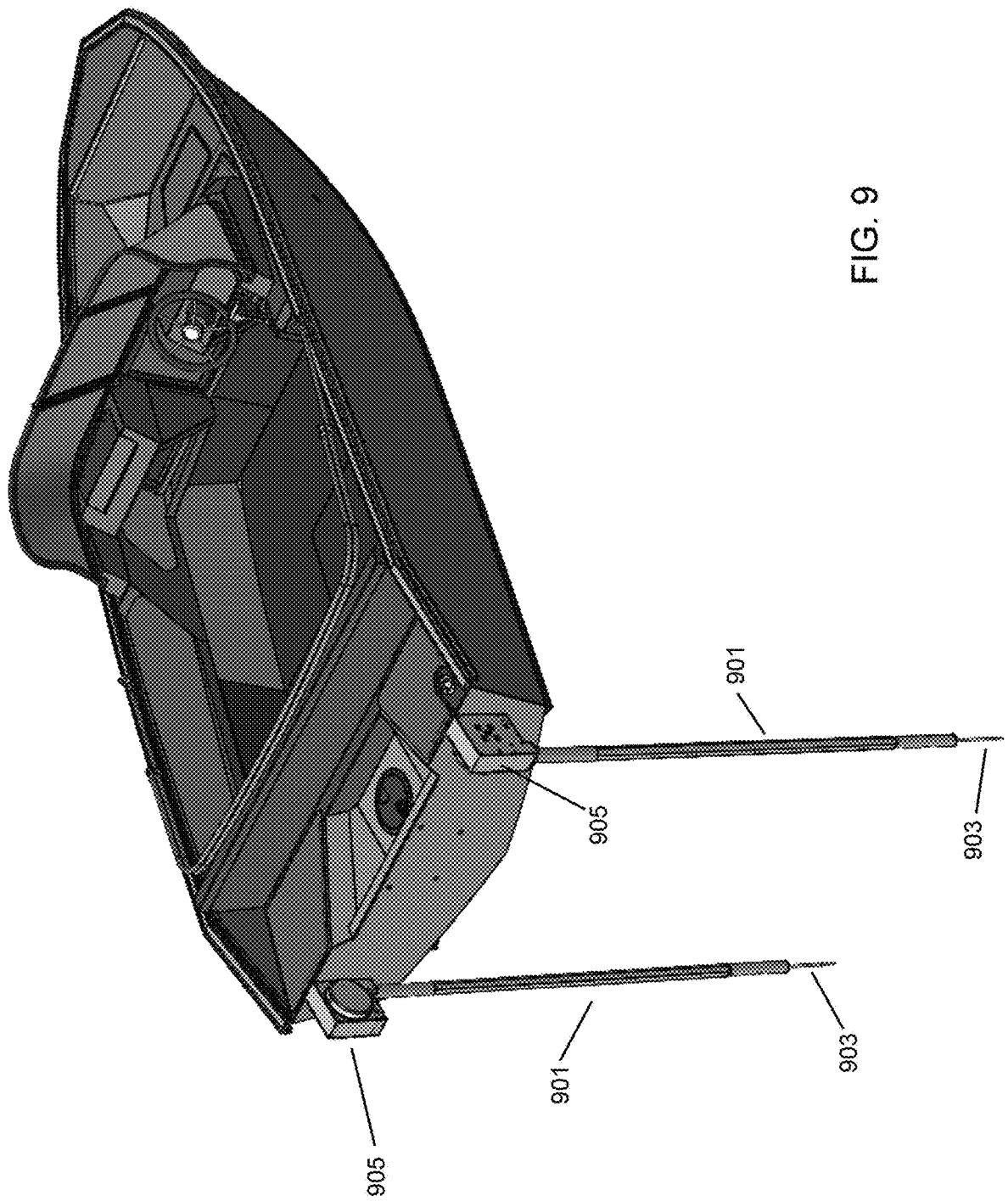
FIG. 9 is a drawing showing a pair of HI booms deployed by any suitable boom deployer positioned on either side of the stern of a recreational fishing boat.

Shallow water application for recreational fishing—FIG. 9 is a drawing showing a pair of HI booms deployed by any suitable boom deployer positioned on either side of the stern of a recreational fishing boat. In this application, the deployed HI booms can function as anchors for recreational fishing activities including bass fishing.

As shown by the exemplary system of FIG. 9, HI booms 901 can be deployed from deployers 905 to push spikes 903 into a shallow bottom or silt of a stream or lake to hold the boat substantially stationary at anchor during fishing.

Boom materials—Suitable exemplary tube materials include thin film polymers (for example, polyester, polyimide, polyamide, and polyvinyl films) and textile fabrics or braided tubes.

Gas pressure containment can be achieved by sealing the fabric, for example, with any suitable polymers and elastomers. The tube can also be sealed for pressurization with a second tube inside of an outer tube, as and inner tube is used in tires.

The boom can also be fabricated, for example, by use of a textile process where the tube and longerons are realized through variation in the textile yarn (tow) weight and fiber type. Similarly, where a resin us used to stabilize the tube, there can be varied in stiffness throughout the tube. For example, a soft resin can be used in tube like regions where the tube of the HI boom should be flexible to create longeron offsets, cavities, and fold lines, while a stiff resin can be used in the stiffer longerons.

Tube materials are relatively flexible compared to the materials of the longerons. While the tube does exhibit some stiffness (to hold the longerons in place), higher stiffness and strength materials, including, for example, fibers, resins, and homogeneous materials are used in the longerons. Relatively more compliant and flexible materials are used in the tube compared to the materials used in the longerons. The tube can be a thin film flexible tube.

Longeron materials—Suitable exemplary longeron materials include spring metals and composites, though polymers can also be used. The longeron material can be of similar thickness to the tube or 10 to 100 times thicker than the tube material. The longerons and the tube can also be continuous and fabricated from the same material. Generally, longerons can be made of any suitable metal, including, for example, spring steel, spring tempered metal. Any suitable composite materials can also be used. Particularly in application needing radio frequency (RF) transparency, fiberglass materials can be used.

The longerons can be placed on the inside, outside, or within the tube thickness. There can be one or more inner tubes, where the longerons can be placed on the inside, outside, or within an inner tube thickness.

The longerons can have different thicknesses in cross-section. The longerons can had different widths in cross section.

While longerons are made of a stiffer material than the tube material, the longerons can follow the shape of the inflated tube of the hybrid inflatable boom inflated state, and the hybrid inflatable boom deflated state, or the longerons can substantially maintain a same longeron shape in cross-section in both of the hybrid inflatable boom inflated state and hybrid inflatable boom deflated state. Longerons can be substantially rectangular, square, or circular rods.

Typically, there is some symmetry in deployed longerons on the tube, however, neither symmetry nor isotropy, flattened or deployed is needed. FIG. 6A is an example of different width longerons distributed with some asymmetry. Similarly, FIG. 6B shows an asymmetry of the top and bottom sides of the tube, where the HI boom uses only two longerons. There can also be different thicknesses of longerons of the same HI boom.

Cavities—In the flattened configuration, there can be on more cavities still present in the deflated tube. The cavity can be used for several purposes. Materials to assist with tube inflation can be placed in the cavity. For example, porous foams, fabrics, and tubes can be used to better allow the inflation gasses or fluids to flow along the flattened and rolled tube length. The cavity can also be used to route wires. The cavity can also be used to route tubes transporting gasses and fluids not used to inflate the tube and the tube itself can be used for said purposes. The cavity can be enlarged on the sides of the boom or between longerons in the flattened configuration.

The HI boom also reduces longeron rolling strains, allowing for thicker longerons that are stiffer and stronger to be used. This is achieved by offsetting the longerons so that they do not land on top of each other or overlap when the boom is flattened. The tube readily bends to allow a thinner flattened shape. Any number and width of longerons and cavities can be used as long as they do not overly increase the thickness of the boom to where they exceed material strain limits.

One or more of the longerons or thinner regions of longerons can overlap while the boom is flattened if they do not greatly increase the boom thickness. The flattened configuration does not need to be symmetric.

Longerons can be mechanically coupled to the tube by any suitable means. Exemplary ways to affix longerons to the tube include any suitable glue or adhesive. Longerons can also be fused to the tube. Longerons and the tube can also be the same material and extruded as a single piece with thinner tube regions and thicker longeron regions. Multi-material co-extrusions with softer tube materials and stiffer longeron material, also combined with textiles can also be used.

Method for deploying a HI boom—With reference to the example of FIG. 1A and FIG. 1B, a method for deploying a deformable hybrid inflatable boom 100 includes: providing an inflatable tube 102 and a plurality of longerons 101, each longeron 101 disposed on and held in place on an inflatable tube surface of tube 102; and inflating the inflatable tube 102 to hold each of the longerons 101 in a place on the inflatable tube surface by a hoop stiffness of the inflatable tube, where an axial stiffness of the deformable hybrid inflatable boom 100 is provided by the plurality of longerons 101.

The subject boom can be used in any application as, such as, for example applications described in U.S. Pat. No. 10,526,785, DEFORMABLE STRUCTURES; U.S. Pat. No. 11,034,467, DEFORMABLE STRUCTURES COLLAPSIBLE TUBULAR MAST (CTM); U.S. patent application Ser. No. 17/171,184, U.S. patent application Ser. No. 17/171,184, COLLAPSIBLE TUBULAR MAST (CTM) WITH SURFACE MATERIAL BETWEEN TRUSSES; and U.S. patent application Ser. No. 17/305,740, COLLAPSIBLE TUBULAR MAST (CTM) WITH SURFACE MATERIAL BETWEEN TRUSSES where structures or hinges flatten and roll or bend. The new HI boom of the Application can be used in any suitable mechanism for rolling booms, such as, for example, the deployer described in U.S. patent application Ser. No. 17/650,132, BOOM DEPLOYER. All of the patents listed hereinabove are assigned to the same assignee OPTERUS Research and Development, Inc. and are incorporated herein by reference in their respective entireties for all purposes.

Stowing a HI boom (retraction, a rolled configuration)—Typically, HI booms self-flatten, such as when an internal tube gas (typically air in terrestrial applications) is allowed to escape. Any suitable gas can be used, such as, air, nitrogen, carbon dioxide, etc. Evaporated or sublimated materials such as water or naphthalene can also be used. On deflation, a HI boom can begin to flatten on its own, particular where there is a relatively thin walled flat tube.

Rolling, such as rolling on a spool, can assist in the flattening process. The spool can be a spool of a HI boom deployer.

Deflation of the tube of a HI boom can be assisted in any suitable application by vacuum. Flattening can be accelerated by pressure differences, such as deflating into a vacuum of space, or by a vacuum pump.

Inflation—Self-sealing tubes can be used to self-heal against inadvertent holes. Any suitable self-sealing technology can be used, such as, for example, self-sealing technologies used for fuel tanks.

HI boom surfaces—Surfaces that are developable or surfaces with zero Gaussian curvature do not have to stretch to form and are not doubly curved. HI booms typically use surfaces that are developable. Therefore, HI booms can be reversibly rolled into a cylinder, spiral, helix, or cone without damaging the HI boom. When substantially flat, the longerons and flattened tube are about parallel to a plane. However, as a rollable structure, it can be helpful to reference a center line in cross section when a portion of or all of the HI boom, is rolled.

Software for designing and modeling HI booms can be provided on a computer readable non-transitory storage medium. A computer readable non-transitory storage medium as non-transitory data storage includes any data stored on any suitable media in a non-fleeting manner. Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, can be combined into many other different systems or applications. Various presently unforeseen or unanticipated alternatives, modifications, variations, or improvements therein can be subsequently made by those skilled in the art which are also intended to be encompassed by the following claims.

What is claimed is:

1. A deformable hybrid inflatable boom comprising:
   an inflatable tube of a first material having an inflatable tube surface and an inflatable tube longitudinal boom direction in a hybrid inflatable boom inflated state; and
   each longeron of a plurality of longerons disposed on said inflatable tube surface and spaced apart from each other and held in place by said inflatable tube, and
   in said hybrid inflatable boom inflated state said each longeron extended in a direction of said inflatable tube longitudinal boom direction,
      wherein said inflatable tube is sealed for pressurization, and
      said longerons are configured to be held in place on said inflatable tube surface by a hoop stiffness of said inflatable tube,
      wherein at least one of said plurality of longerons is disposed on an outer surface of said inflatable tube,
      wherein, in a hybrid inflatable boom flattened state, said plurality of longerons are interleaved with each other between an undulating flattened tube, and
      wherein said inflatable tube comprises a flexible textile material or a polymer reinforced textile material, and said longerons comprise a material stiffer than said inflatable tube.

2. The deformable hybrid inflatable boom of claim 1, wherein in a hybrid inflatable boom flattened state, said plurality of longerons are interleaved with each other between an undulating flattened tube,
   wherein, in the flattened state, each longeron is nested within a concave trough formed by the undulating tube wall, and the tube wall folds over and around each longeron to provide overwrap of the wall around the longeron.

3. The deformable hybrid inflatable boom of claim 1,
   wherein, in a hybrid inflatable boom flattened state, said plurality of longerons are interleaved such that successive longerons alternate between being disposed on an outer surface and an inner surface of said inflatable tube.

4. The deformable hybrid inflatable boom of claim 1, wherein at least one longeron has a different longeron width in cross-section than another different longeron width.

5. The deformable hybrid inflatable boom of claim 1, wherein at least one longeron has a different longeron thickness in cross-section than another different longeron thickness.

6. The deformable hybrid inflatable boom of claim 1, wherein at least one longeron is disposed on an inner surface of said inflatable tube.

7. The deformable hybrid inflatable boom of claim 1, wherein said deformable hybrid inflatable boom has an extended state, a flattened state, and a rolled state, where a stiffness and strength of said deformable hybrid inflatable boom in the extended state is greater than a different stiffness and a different strength of said deformable hybrid inflatable boom in the flattened state.

8. The deformable hybrid inflatable boom of claim 7, wherein in said flattened state, a height in cross-section of a flattened deformable hybrid inflatable boom is less than a sum of two times an inflatable tube wall thickness plus two times a longeron wall thickness.

9. The deformable hybrid inflatable boom of claim 1, further comprising at least one enlarged end cavity.

10. The deformable hybrid inflatable boom of claim 1, further comprising at least one longitudinal cavity to house at least one wire or at least one cable.

11. The deformable hybrid inflatable boom of claim 1, where said inflatable tube comprises a polymer material.

12. The deformable hybrid inflatable boom of claim 1, where said inflatable tube comprises a textile material or a polymer reinforced textile material.

13. The deformable hybrid inflatable boom of claim 1, where said plurality of longerons comprises at least one of a composite material, fiberglass, or metal.

14. The deformable hybrid inflatable boom of claim 1, where said plurality of longerons comprises steel.

15. The deformable hybrid inflatable boom of claim 14, where said plurality of longerons comprises spring tempered metal or spring steel.

16. The deformable hybrid inflatable boom of claim 1, wherein said plurality of longerons are substantially parallel to a center line in a hybrid inflatable boom flattened state, and where said hybrid inflatable boom is rolled in a hybrid inflatable boom stowed state.

17. A deformable boom comprising:
   an inflatable tube defining a longitudinal axis;
      a plurality of longerons disposed on the inflatable tube and extending along the longitudinal axis;
         wherein said inflatable tube is sealed for pressurization,
         wherein said longerons are configured to be held in place on said inflatable tube surface by a hoop stiffness of said inflatable tube,
         wherein the inflatable tube is configured to transition between an inflated state and a deflated state;
         wherein, in the deflated state, the inflatable tube and the longerons form a boom structure with adjacent longerons disposed in radial spaced relation relative to the longitudinal axis, and wherein said deformable hybrid inflatable boom further comprises at least one enlarged end cavity in the deflated state wherein at least one of said plurality of longerons is disposed on an outer surface of said inflatable tube, wherein, in the deflated state, said plurality of longerons are interleaved with each other between undulating portions of the flattened inflatable tube, and wherein said inflatable tube comprises a flexible textile material or a polymer reinforced textile material, and said longerons comprise a material stiffer than said inflatable tube.

18. A method for deploying a deformable hybrid inflatable boom comprising:

providing an inflatable tube having a plurality of longerons disposed thereon, each longeron disposed on and held in place on an inflatable tube surface;

wherein said inflatable tube is sealed for pressurization, and inflating said inflatable tube to hold each of said longerons in a place on said inflatable tube surface by a hoop stiffness of said inflatable tube, where an axial stiffness of said deformable hybrid inflatable boom is provided by said plurality of longerons, wherein at least one of said plurality of longerons is disposed on an outer surface of said inflatable tube, wherein, in a flattened state, said plurality of longerons are interleaved with each other between undulating portions of the flattened inflatable tube, and wherein said inflatable tube comprises a flexible textile material or a polymer reinforced textile material, and said longerons comprise a material stiffer than said inflatable tube.

* * * * *